United States Patent
Hayashi et al.

(10) Patent No.: US 11,009,478 B2
(45) Date of Patent: May 18, 2021

(54) GAS SENSOR INCLUDING SENSING SECTION FOR SENSING PREDETERMINED PHYSICAL QUANTITY AND VOLTAGE SWITCHING SECTION FOR SWITCHING BETWEEN VOLTAGES FOR HEATING GAS SENSITIVE FILM

(71) Applicant: KABUSHIKI KAISHA TOSHIBA, Minato-ku (JP)

(72) Inventors: Yumi Hayashi, Ayase (JP); Hiroaki Yamazaki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 243 days.

(21) Appl. No.: 16/293,980

(22) Filed: Mar. 6, 2019

(65) Prior Publication Data
US 2020/0011828 A1    Jan. 9, 2020

(30) Foreign Application Priority Data
Jul. 3, 2018    (JP) .............................. JP2018-126572

(51) Int. Cl.
*G01N 27/22* (2006.01)
*G01N 27/12* (2006.01)

(52) U.S. Cl.
CPC ......... *G01N 27/228* (2013.01); *G01N 27/227* (2013.01)

(58) Field of Classification Search
CPC ............. G01N 33/0013; G01N 29/228; G01N 33/0016; G01N 33/0031; G01N 27/124; G01N 27/227; G01N 27/228; G01N 2027/222; G01N 33/0022; G01N 25/20; G01N 27/221; G01N 33/005
See application file for complete search history.

(56) References Cited

U.S. PATENT DOCUMENTS

| | | | |
|---|---|---|---|
| 9,837,997 B2 * | 12/2017 | Ariyama | ................ H03K 5/003 |
| 2016/0033433 A1 * | 2/2016 | Nakano | ................ G01N 33/005 |
| | | | 73/25.01 |
| 2017/0018471 A1 * | 1/2017 | Aono | ................ G01C 19/5783 |
| 2017/0343522 A1 | 11/2017 | Ikehashi et al. | |
| 2019/0086377 A1 | 3/2019 | Ikehashi et al. | |

FOREIGN PATENT DOCUMENTS

| | | |
|---|---|---|
| JP | S60-113141 A | 6/1985 |
| JP | 2001-296238 | 10/2001 |
| JP | 2005-134311 A | 5/2005 |
| JP | 2008-8869 | 1/2008 |
| JP | 2017-215170 A | 12/2017 |
| JP | 2019-56607 A | 4/2019 |

* cited by examiner

*Primary Examiner* — Brandi N Hopkins
(74) *Attorney, Agent, or Firm* — Oblon, McClelland, Maier & Neustadt, L.L.P.

(57) ABSTRACT

According to one embodiment, a gas sensor includes a film structure including a gas sensitive film and a heater film heating the gas sensitive film, a physical quantity sensing section sensing a predetermined physical quantity which varies based on storage of a gas to be carried out by the gas sensitive film, a voltage generation section generating a first voltage for heating the gas sensitive film at a first temperature and a second voltage for heating the gas sensitive film at a second temperature higher than the first temperature, and a voltage switching section switching between the first voltage and the second voltage to be supplied to the heater film.

12 Claims, 6 Drawing Sheets

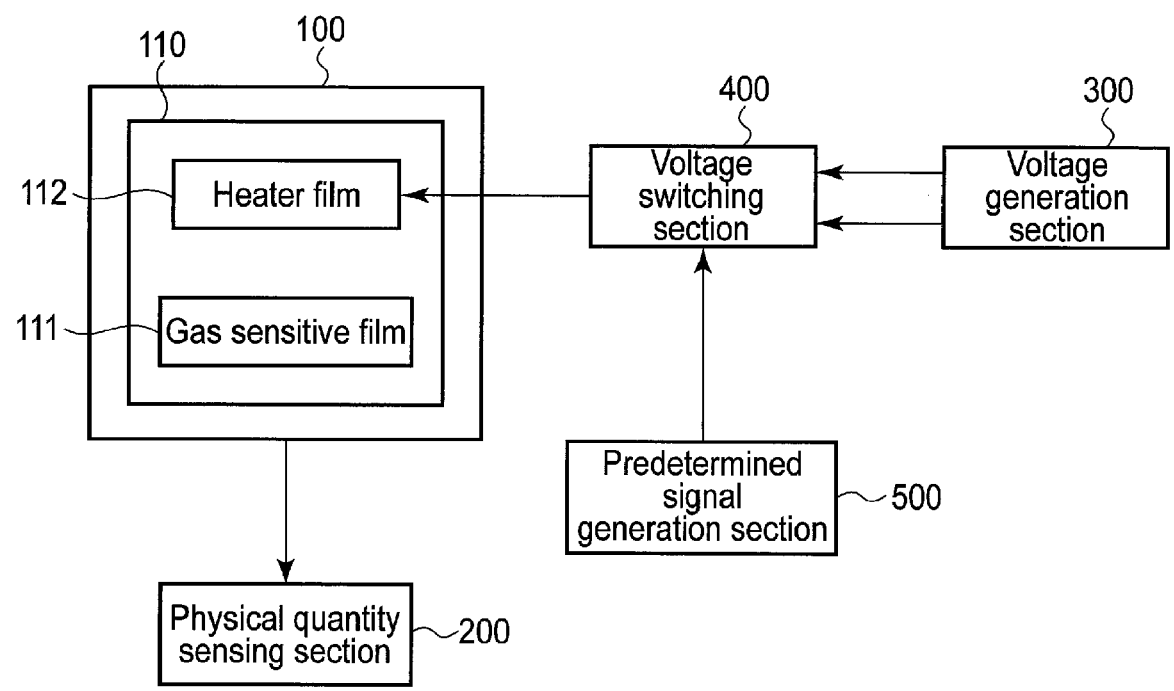
F I G. 1

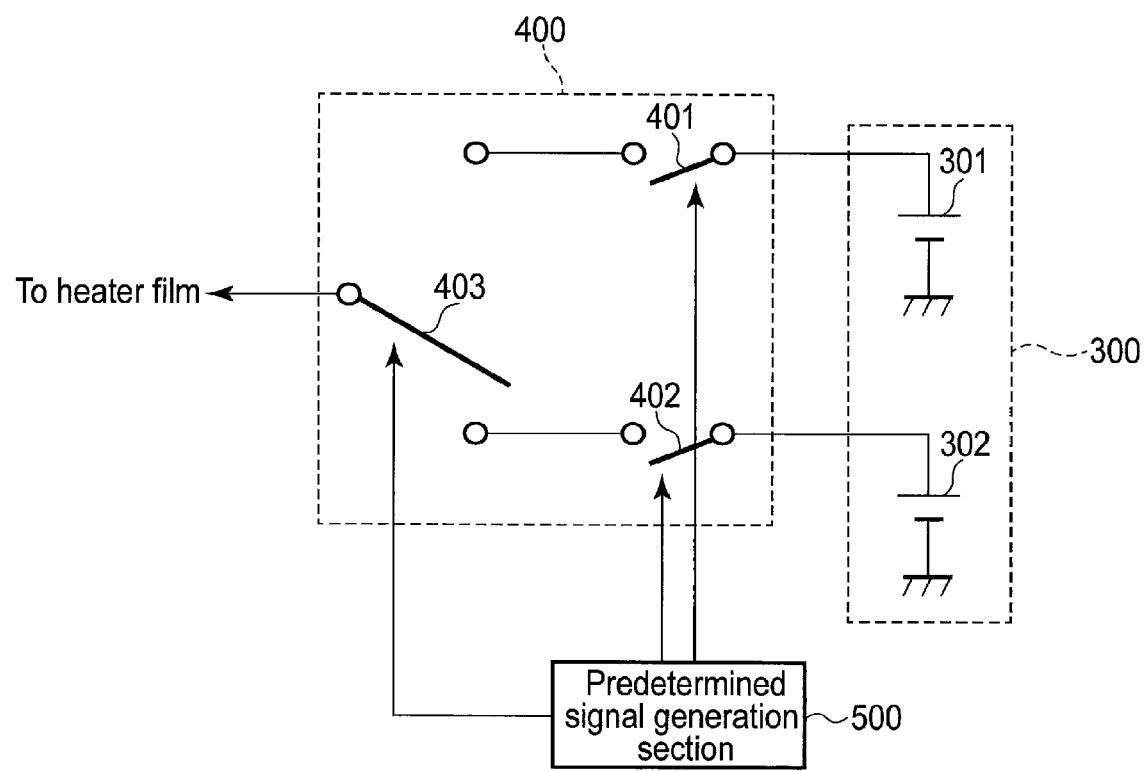
F I G. 4

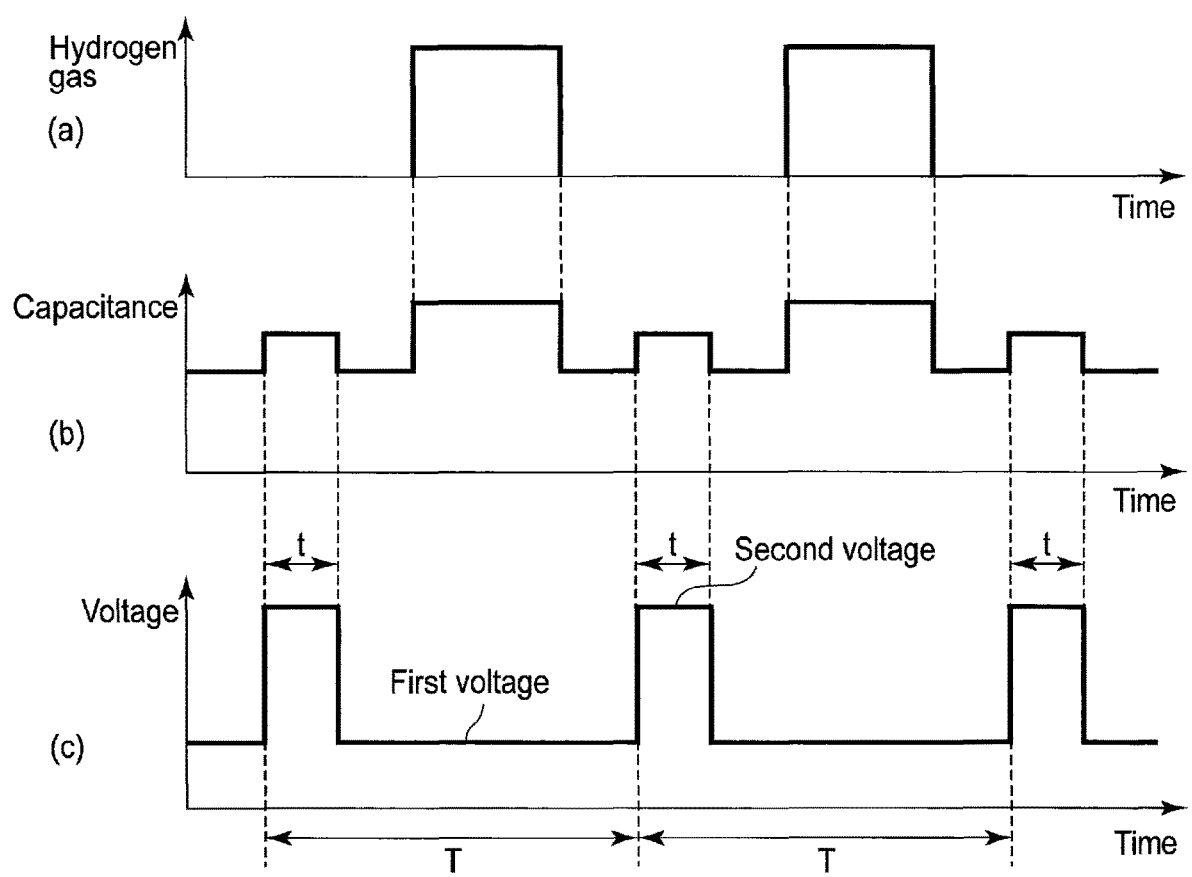
F I G. 5

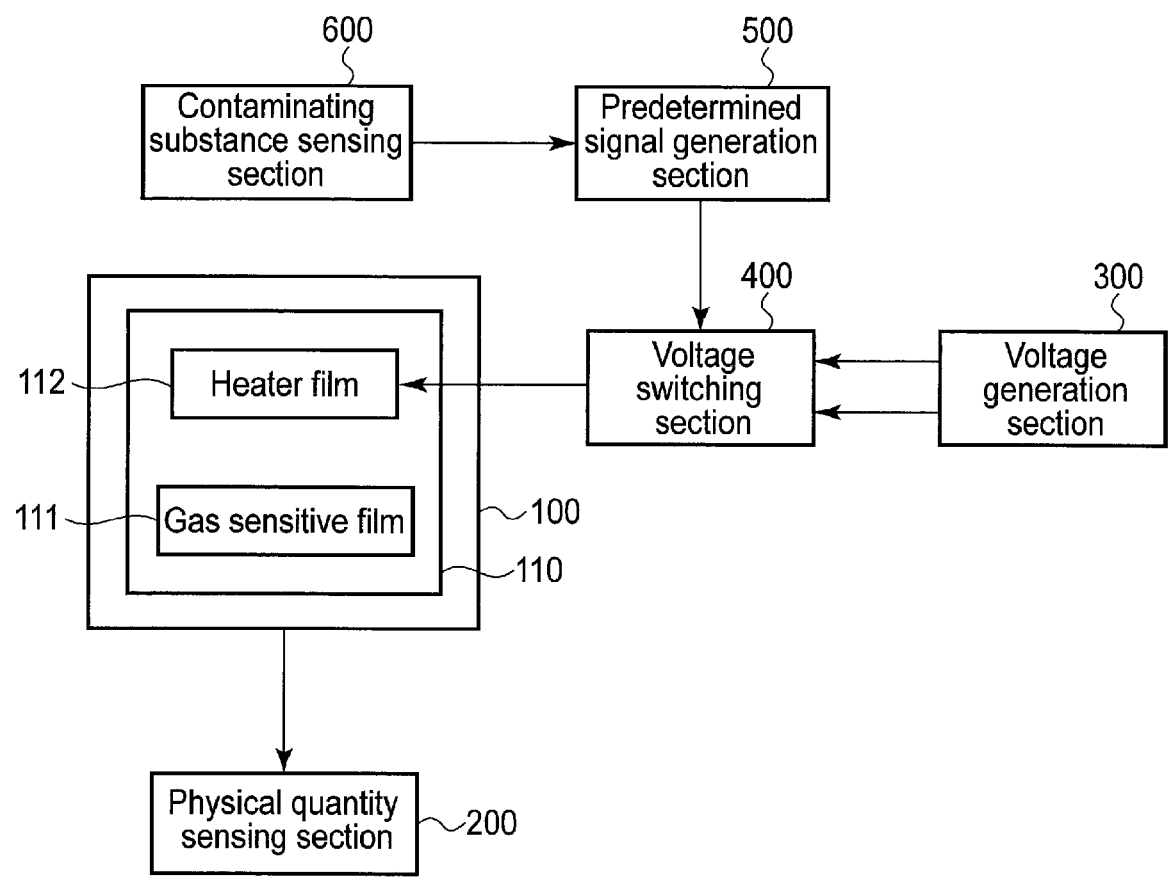
F I G. 6

GAS SENSOR INCLUDING SENSING SECTION FOR SENSING PREDETERMINED PHYSICAL QUANTITY AND VOLTAGE SWITCHING SECTION FOR SWITCHING BETWEEN VOLTAGES FOR HEATING GAS SENSITIVE FILM

CROSS-REFERENCE TO RELATED APPLICATIONS

This application is based upon and claims the benefit of priority from Japanese Patent Application No. 2018-126572, filed Jul. 3, 2018, the entire contents of which are incorporated herein by reference.

FIELD

Embodiments described herein relate generally to a gas sensor.

BACKGROUND

In a gas sensor having a film structure including a gas sensitive film and heater film, gas sensing is carried out in a state where the gas sensitive film is heated by the heater film in order to improve the sensing sensitivity (sensing speed) of the gas.

However, in the gas sensor using the above-mentioned gas sensing method, appropriate gas sensing is not always carried out.

BRIEF DESCRIPTION OF THE DRAWINGS

FIG. 1 is a block diagram showing the overall configuration of a gas sensor according to an embodiment.

FIG. 4 is a view schematically showing the configuration of each of a voltage generation section, voltage switching section, and predetermined signal generation section according to the embodiment.

FIG. 5 is a timing chart schematically showing an operation of the gas sensor according to the embodiment.

FIG. 6 is a block diagram showing the overall configuration of a gas sensor according to a first modification example of the embodiment.

DETAILED DESCRIPTION

Figure 2:
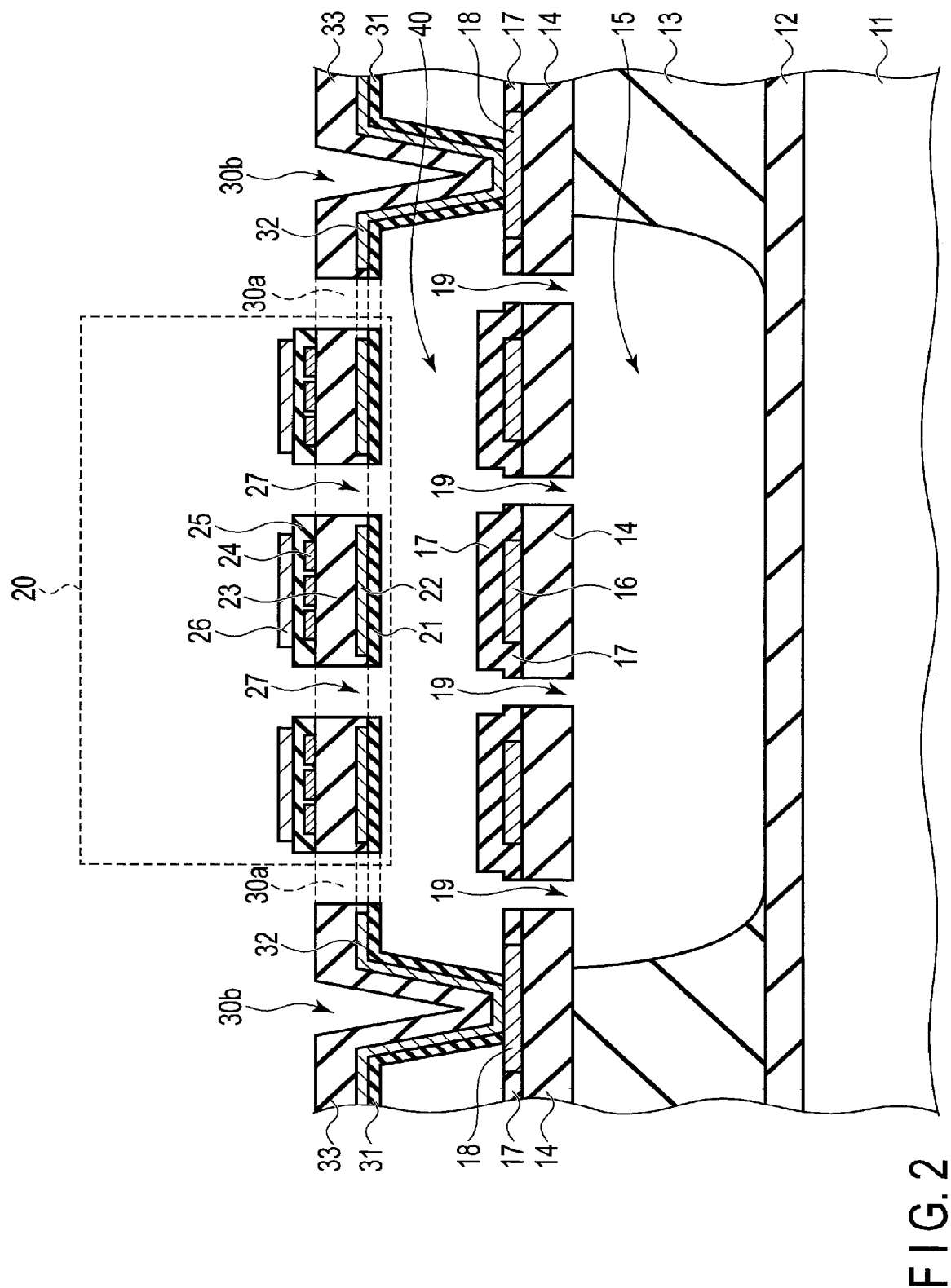
FIG. 2 is a cross-sectional view schematically showing the specific configuration of a sensor main body according to the embodiment.

In general, according to one embodiment, a gas sensor includes: a film structure including a gas sensitive film and a heater film heating the gas sensitive film; a physical quantity sensing section sensing a predetermined physical quantity which varies based on storage of a gas to be carried out by the gas sensitive film; a voltage generation section generating a first voltage for heating the gas sensitive film at a first temperature and a second voltage for heating the gas sensitive film at a second temperature higher than the first temperature; and a voltage switching section switching between the first voltage and the second voltage to be supplied to the heater film.

Hereinafter, an embodiment will be described with reference to the accompanying drawings.

FIG. 1 is a block diagram showing the overall configuration of a gas sensor according to the embodiment.

The gas sensor shown in FIG. 1 is provided with a sensor main body 100, physical quantity sensing section 200, voltage generation section 300, voltage switching section 400, and predetermined signal generation section 500.

The sensor main body 100 includes a film structure 110 including a gas sensitive film (gas storage film) 111, and heater film 112 configured to heat the gas sensitive film 111.

FIG. 2 is a cross-sectional view schematically showing the specific configuration of the sensor main body 100.

As shown in FIG. 2, an insulating film 12 is formed on a semiconductor substrate (silicon substrate or the like) 11, an insulating film 13 is formed on the insulating film 12, and an insulating film 14 is formed on the insulating film 13. In the insulating film 13, a cavity 15 is formed, and the cavity 15 is surrounded by the insulating films 12, 13, and 14.

On the insulating film 14 and above the cavity 15, a lower electrode 16 of a variable capacitor is provided. This lower electrode 16 is covered with an insulating film 17. Further, a metallic film 18 is provided on the insulating film 14. The lower electrode 16 and metallic film 18 are formed in the same process. Through-holes 19 are formed in the insulating film 14 and insulating film 17.

Above the cavity 15, a film structure 20 (corresponding to the film structure 110 of FIG. 1) is provided. In this embodiment, the film structure 20 has a structure in which an insulating film 21, upper electrode 22 of the variable capacitor, insulating film 23, heater film 24 (corresponding to the heater film 112 of FIG. 1), insulating film 25, and gas sensitive film (gas storage film) 26 (corresponding to the gas sensitive film 111 of FIG. 1) are stacked one on top of the other. Through-holes 27 are formed in the film structure 20.

The film structure 20 is connected to the metallic film 18 through a spring section 30a and anchor section 30b. The spring section 30a and anchor section 30b are formed in the same process as the film structure 20, and both have a structure in which an insulating film 31, dummy electrode 32, and insulating film 33 are stacked one on top of the other.

Beneath the film structure 20, a cavity 40 is formed, and the cavity 40 is surrounded by the insulating film 17, insulating film 21, and insulating film 31.

In this embodiment, the gas sensitive film 26 is formed of a hydrogen storage film, and thus the gas sensitive film 26 is capable of storing hydrogen gas. The gas sensitive film 26 is formed of a material containing palladium (Pd). More specifically, the gas sensitive film 26 is formed of a palladium film or palladium alloy film. As the palladium alloy film, for example, a PdCuSi film can be used.

Upon storage of the hydrogen gas, the gas sensitive film (hydrogen sensitive film) 26 expands. As a result, the gas sensitive film 26 is deformed, and film structure 20 is also deformed. The film structure 20 is connected to the anchor section 30b through the spring section 30a, and hence the film structure 20 is deformed downwardly or upwardly. When the film structure 20 is downwardly or upwardly deformed, the distance between the lower electrode (fixed electrode) 16 of the variable capacitor and upper electrode (movable electrode) 22 thereof changes, and thus the capacitance of the variable capacitor also changes. Accordingly, by sensing a change in the capacitance of the variable capacitor, it is possible to sense the gas sensing amount (hydrogen storage amount).

In FIG. 1, the physical quantity sensing section 200 configured to sense a varying predetermined physical quantity on the basis of storage of the gas to be carried out by the gas sensitive film 111 (corresponding to the gas sensitive film 26 of FIG. 2) is provided. In this embodiment, the predetermined physical quantity is the capacitance varying according to the deformation of the gas sensitive film 111. That is, the predetermined physical quantity is the capacitance of the variable capacitor formed of the lower electrode (first electrode) 16 and upper electrode (second electrode) 22 facing the lower electrode 16, the lower electrode 16 and upper electrode 22 being shown in FIG. 2. On the basis of the physical quantity sensed as the predetermined physical quantity, it is possible to sense the predetermined gas concentration.

Next, the function of the heater film 112 (in FIG. 2, heater film 24) in this embodiment will be described below.

In general, it is known that when a gas sensing operation is carried out in a state where the gas sensitive film is heated, the sensing sensitivity (sensing speed) of the gas sensing is improved. In this embodiment, in order to heat the gas sensitive film 26, the heater film 24 is included in the film structure 20.

However, for example, when hydrogen sulfide exists around the film structure 20, there is a possibility of a metallic sulfide resulting from the hydrogen sulfide being formed. When this metallic sulfide adheres to the gas sensitive film 26, there is a possibility of the sensing sensitivity or sensing accuracy of the gas being lowered. Although the gas sensitive film 26 is heated by the heater film 24, it is difficult to remove the metallic sulfide by the heating temperature (first temperature) at this time.

Thus, in this embodiment, during the period for carrying out gas sensing, the gas sensitive film 26 is heated at the first temperature (for example, 50 to 100° C.) and, during the period for not carrying out gas sensing, the gas sensitive film 26 is heated at a second temperature (for example, 150 to 200° C.) higher than the first temperature. By the heating at the second temperature, it is possible to volatilize and remove the adhered contaminating substance such as the metallic sulfide or the like. It should be noticed that the operation of removing the contaminating substance by the heating at the second temperature is hereinafter referred to as the refreshing operation.

Figure 3:
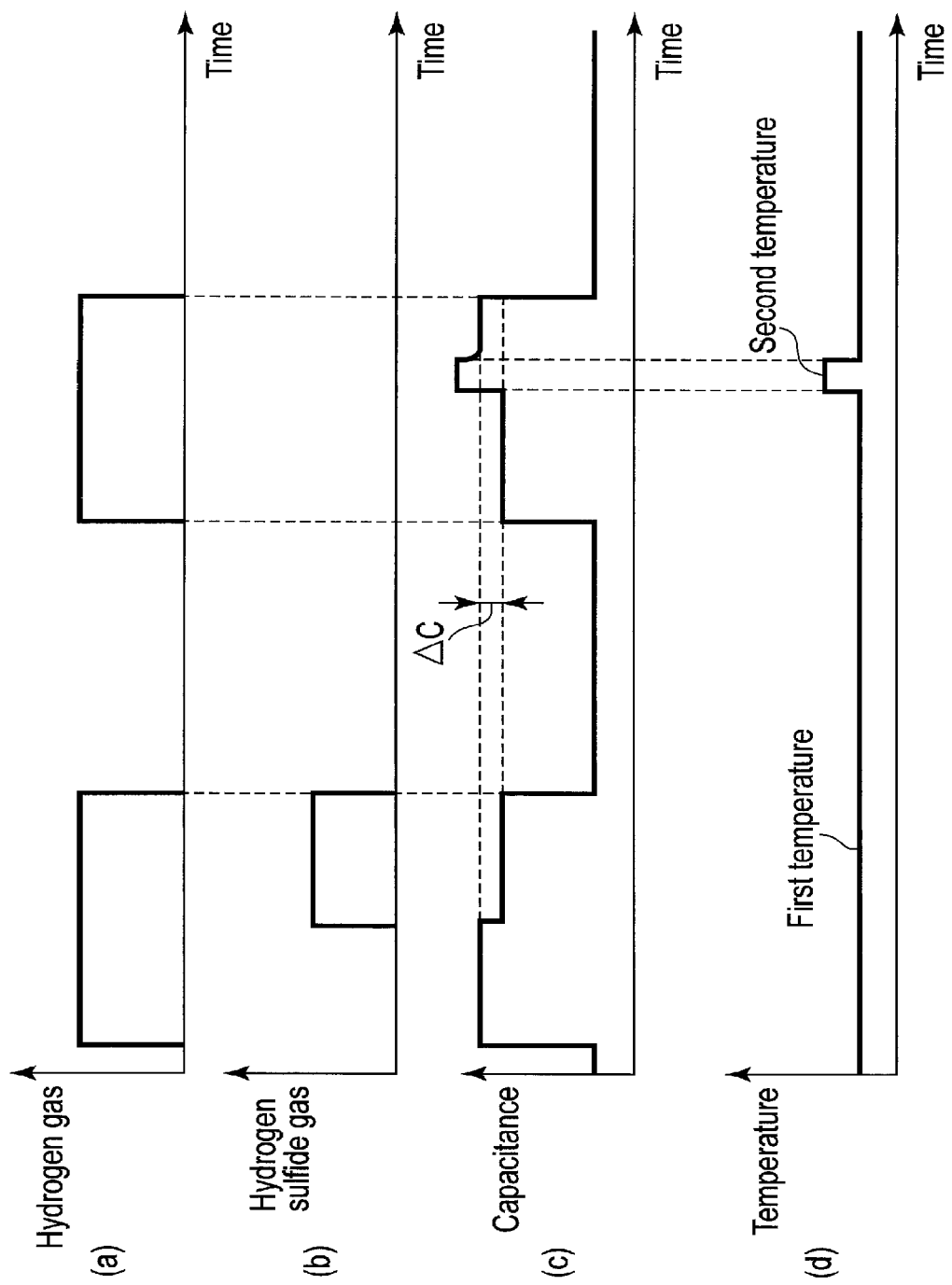
FIG. 3 is a view schematically showing the effect at the time when the gas sensitive film is heated at a second temperature according to the embodiment.

FIG. 3 is view schematically showing the effect at the time when the gas sensitive film 26 is heated at the second temperature. FIG. 3(a) shows the hydrogen gas concentration around the film structure 20, FIG. 3(b) shows the hydrogen sulfide concentration around the film structure 20, FIG. 3(c) shows the capacitance of the variable capacitor, and FIG. 3(d) shows the heating temperature of the gas sensitive film 26.

As shown in FIG. 3, while the heating is carried out at the first temperature, if hydrogen sulfide exists, the capacitance of the variable capacitor becomes lower than the proper capacitance by an amount ΔC. However, after carrying out the heating at the second temperature, the capacitance of the variable capacitor exhibits the proper capacitance. Accordingly, by heating the gas sensitive film 26 at the second temperature higher than the first temperature, the lowered gas sensing sensitivity can be restored. This is because the adhered contaminating substance such as the metallic sulfide or the like has been removed by the high-temperature heating.

In the gas sensor shown in FIG. 1, in order to realize the above-mentioned function, the voltage generation section 300 configured to generate a first voltage for heating the gas sensitive film 111 at the first temperature and second voltage for heating the gas sensitive film 111 at the second temperature higher than the first temperature, and voltage switching section 400 configured to selectively switch between the first voltage and second voltage to be supplied to the heater film 112 are provided. The first voltage and second voltage are selectively switched between each other on the basis of a predetermined signal generated by the predetermined signal generation section 500.

FIG. 4 is a view schematically showing the configuration of each of the voltage generation section 300, voltage switching section 400, and predetermined signal generation section 500.

In the voltage generation section 300, a first voltage source 301 configured to generate the first voltage, and second voltage source 302 configured to generate the second voltage are provided. In the voltage switching section 400, switches 401, 402, and 403 are provided. By the predetermined signal generated from the predetermined signal generation section 500, the switches 401, 402, and 403 are switched, and one of the first voltage and second voltage is supplied to the heater film.

FIG. 5 is a timing chart schematically showing the operation of the gas sensor according to this embodiment. FIG. 5(a) shows the hydrogen gas concentration around the film structure 110, FIG. 5(b) shows the capacitance of the variable capacitor and, FIG. 5(c) shows the voltage to be applied to the heater film 112.

As shown in FIG. 5(c), the first voltage and second voltage are selectively switched between each other at intervals of predetermined periods by the voltage switching section 400. In FIG. 5, the first voltage and second voltage are selectively switched between each other at intervals of fixed periods T. More specifically, when a fixed period T has elapsed, a predetermined signal is generated from the predetermined signal generation section 500, and the second voltage is applied to the heater film 112 for a predetermined time t from the time when the predetermined signal has been generated.

The first voltage is already applied to the heater film 112 when the predetermined physical quantity is sensed by the physical quantity sensing section 200, and the second voltage is not applied to the heater film 112 when the predetermined physical quantity is sensed by the physical quantity sensing section 200. Further, the period for which the second voltage is applied to the heater film 112 is shorter than the period for which the first voltage is applied thereto.

It should be noted that in the example shown in FIG. 5, although during the period for application of the second voltage, the capacitance is increased, this is due to the expansion of the gas sensitive film 111 caused by the heating.

As described above, in this embodiment, in order to improve the sensing sensitivity (sensing speed) of the gas sensitive film 111, the gas sensitive film 111 is heated at the first temperature and, further the gas sensitive film 111 is heated at the second temperature higher than the first temperature. As described above, by heating the gas sensitive film 111 at the second temperature (refreshing operation), it is possible to remove the contaminating substance adhering to the film structure 110 (particularly, the gas sensitive film 111), and obtain a high-accuracy gas sensor excellent in gas sensing sensitivity and gas sensing speed.

Further, in this embodiment, it is sufficient if a refreshing operation is carried out at intervals of predetermined periods (for example, once a day, for about several minutes), and hence the refreshing operation can be carried out with low power consumption.

Further, in this embodiment, the refreshing operation is carried out at intervals of predetermined periods, and hence there is no need to provide a special component for contaminating substance sensing, and it is possible to produce a gas sensor of low cost.

It should be noted that in this embodiment, heating at the first temperature may be carried out continuously, or may be carried out intermittently. For example, heating at the first temperature may intermittently be carried out at intervals of predetermined periods.

Next, a first modification example of this embodiment will be described below. It should be noted that the fundamental items are identical to the above-mentioned embodiment, and hence descriptions of the items already given in the above-mentioned embodiment are omitted.

FIG. 6 is a block diagram showing the overall configuration of a gas sensor according to the first modification example. The gas sensor shown in FIG. 6 is, in addition to a sensor main body 100, physical quantity sensing section 200, voltage generation section 300, voltage switching section 400, and predetermined signal generation section 500, further provided with a contaminating substance sensing section 600.

In the above-mentioned embodiment, although the refreshing operation is carried out at intervals of predetermined periods, in this modification example, the refreshing operation is carried out when a contaminating substance of a predetermined amount or more is sensed by the contaminating substance sensing section 600. More specifically, a sensor for sensing a contaminating substance is provided in advance as the contaminating substance sensing section 600 separately from the sensor main body 100, and a contaminating substance is sensed by the sensor for sensing a contaminating substance. When a contaminating substance of a predetermined amount or more is sensed by the contaminating substance sensing section 600, a predetermined signal is generated from the predetermined signal generation section 500, and the second voltage is supplied from the voltage switching section 400 to the heater film 112.

In this modification example too, an advantage identical to the above-mentioned embodiment can be obtained. Further, in this modification example, by providing the contaminating substance sensing section 600, it is possible to carry out the refreshing operation at the optimum timing.

It should be noted that when a contaminating substance has adhered to the film structure 20, and the sensed value at the physical quantity sensing section 200 has changed, the predetermined signal may be generated from the predetermined signal generation section when the change has become a predetermined amount or more. In this case, the contaminating substance sensing section 600 may not be provided.

Next, a second modification example of this embodiment will be described below. It should be noted that the fundamental items are identical to the above-mentioned embodiment, and hence descriptions of the items already given in the above-mentioned embodiment are omitted. Further, the fundamental configuration of the sensor main body is identical to the configuration of the above-mentioned embodiment, and hence this modification example will be described below with reference to FIG. 2.

In the above-mentioned embodiment, sensing of the predetermined gas (hydrogen gas or the like) is carried out on the basis of a change in the capacitance of the variable capacitor formed of the lower electrode 16 and upper electrode 22. That is, in the above-mentioned embodiment, the capacitance of the variable capacitor is used as the predetermined physical quantity. In this modification example, as the predetermined physical quantity, the resistance of the gas sensitive film 26 changing according to gas storage is used. Hereinafter, the description of the above will be given.

When storing the gas, the gas sensitive film 26 expands, but the resistance thereof also changes by the gas storage. In this modification example, sensing of the predetermined gas (hydrogen gas or the like) is carried out by making the gas sensitive film 26 function as a variable resistor.

As described above, also when gas sensing is carried out on the basis of a change in the resistance of the gas sensitive film 26, an advantage identical to the above-mentioned embodiment can be obtained.

It should be noted that in this modification example, the lower electrode 16 and upper electrode 22 may not be provided. Further, in this modification example too, by providing the cavities 15 and 40, it is possible to efficiently supply the heat of the heater film 24 to the gas sensitive film 26.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A gas sensor comprising:
   a film structure including a gas sensitive film and a heater film heating the gas sensitive film;
   a physical quantity sensing section sensing a predetermined physical quantity which varies based on storage of a gas to be carried out by the gas sensitive film;
   a voltage generation section generating a first voltage for heating the gas sensitive film at a first temperature and a second voltage for heating the gas sensitive film at a second temperature higher than the first temperature; and
   a voltage switching section switching between the first voltage and the second voltage to be supplied to the heater film.

2. The gas sensor of claim 1, wherein
   the voltage switching section selectively switches between the first voltage and the second voltage based on a predetermined signal.

3. The gas sensor of claim 2, wherein
   the predetermined signal is a signal based on an elapse of time.

4. The gas sensor of claim 2, further comprising a substance sensing section sensing a substance different from the gas to be stored by the gas sensitive film, wherein
   the predetermined signal is a signal based on sensing of the substance to be carried out by the substance sensing section.

5. The gas sensor of claim 1, wherein
   the voltage switching section selectively switches between the first voltage and the second voltage at intervals of predetermined periods.

6. The gas sensor of claim 1, wherein
   the first voltage is already applied to the heater film when the predetermined physical quantity is sensed by the physical quantity sensing section, and the second voltage is not applied to the heater film when the predetermined physical quantity is sensed by the physical quantity sensing section.

7. The gas sensor of claim 1, wherein a period for which the second voltage is applied is shorter than a period for which the first voltage is applied.

8. The gas sensor of claim 1, wherein the predetermined physical quantity is capacitance varying according to a deformation of the gas sensitive film.

9. The gas sensor of claim 8, further comprising:
a substrate; and
a first electrode provided on the substrate, wherein
the film structure further includes a second electrode facing the first electrode, and
the capacitance is capacitance of a variable capacitor constituted of the first electrode and the second electrode.

10. The gas sensor of claim 1, wherein the predetermined physical quantity is resistance of the gas sensitive film varying according to the gas sensing.

11. The gas sensor of claim 1, wherein the gas to be stored by the gas sensitive film includes hydrogen gas.

12. The gas sensor of claim 1, wherein the gas sensitive film contains therein palladium (Pd).

* * * * *